455/3

United States Patent [19]

Ellis

[11] 3,794,923

[45] Feb. 26, 1974

[54] HEAD END INTERCONNECTION SYSTEM FOR CABLE TV SYSTEMS

[75] Inventor: Lynn W. Ellis, Westport, Conn.

[73] Assignee: International Telephone and Telegraph Corporation, Nutley, N.J.

[22] Filed: Dec. 14, 1972

[21] Appl. No.: 315,067

[52] U.S. Cl. ..... 325/308, 178/DIG. 13, 179/15 FD, 325/51

[51] Int. Cl. .......................... H04n 7/16, H04n 7/08

[58] Field of Search 178/DIG. 13; 179/2 AS, 15 FD; 325/3, 31, 51, 308, 309

[56] References Cited

UNITED STATES PATENTS 3,325,600 6/1967 Fierston et al. .......................... 325/3

OTHER PUBLICATIONS

"Two-Way Applications for Cable Television Systems in the 70's" by Ronald K. Jurgen – IEEE Spectrum, November 1971, pp. 39–54.

*Primary Examiner*—Robert L. Richardson
*Assistant Examiner*—Marc E. Bookbinder
*Attorney, Agent, or Firm*—John T. O'Halloran; Menotti J. Lombardi, Jr.; Alfred C. Hill

[57] ABSTRACT

This relates to an arrangement for interconnecting head ends of two or more conventional cable TV systems over the distribution cable or trunk employed for the TV signal distribution in a cable TV system. The technique employed is frequency division multiplexing a digitally encoded TV signal or signals capable of being received at one head end but not at the other head end of the two cable TV systems on the distribution cables of the two cable TV systems employed for conventional TV signal distribution under conditions avoiding mutual interference between the frequency division multiplexed digitally encoded TV signal or signals and the conventional analog TV signal or signals being distributed.

40 Claims, 7 Drawing Figures

HEAD END INTERCONNECTION SYSTEM FOR CABLE TV SYSTEMS

BACKGROUND OF THE INVENTION

This relates to cable TV systems and more particularly to an interconnection system connecting the head ends of two or more cable TV systems.

Because of the cumulative buildup of intermodulation and cross modulation products in cable television (TV) amplifiers, cable TV systems are limited to a total cascade of about 25 distribution cable amplifiers on any one route where one-half inch cable is employed. Therefore, the maximum distance from the head end is typically 37.5 kilofeet. Where larger areas are to be covered, a secondary head end must be installed and either connected to the first head end by other means or equipped with its own off the air pickup facilities.

The interconnection system most commonly used between the head ends of two cable TV distribution systems has been a microwave radio link. An alternative interconnection system that has been employed utilizes lasers.

Where microwave radio links are employed it is necessary to obtain a license from the Federal Communication Commission (or a comparable authority in other countries). Some times desirable frequencies are not available and higher frequencies must be used which are susceptible to rain attenuation. Lasers are also interrupted by fog and are more adversely affected by rain.

Higher performance systems for cable are known utilizing vestigial sideband modulation. These cable systems require separate cables of the type utilized for telephony and are, therefore, unlikely to be economically attractive to the cable TV system operator.

SUMMARY OF THE INVENTION

An object of the present invention is to provide an interconnection system between the head ends of two or more cable TV systems which overcomes the disadvantages of the above described interconnection systems.

Another object of the present invention is the provision of an interconnection system between head ends of two or more cable TV systems employing the same distribution cable as is utilized for TV signal distribution.

A further object of the present invention is an interconnection system for the head ends of at least two cable TV systems wherein those intelligence signals, such as TV signals, that can be received at one head end but not at the other head end are digitally encoded to form a digitally coded bit stream which is the frequency division multiplexed with the analog TV signal being distributed to subscribers on the same distribution cable used in the conventional distribution of analog TV signals.

An advantage of the present system is that the cable TV system operator does not need to obtain a license for microwave frequencies nor does the operator have to install a separate interconnection facility except for a short bridging cable that bridges the gap between two adjacent cable TV systems.

A feature of the present invention is the provision of a head end interconnection system for cable television systems comprising: a first cable television system including a first head end, and a first television signal distribution cable coupled to the first head end; a second cable television system including a second head end, and a second television signal distribution cable coupled to the second head end, the second distribution cable extending into the vicinity of the first distribution cable, a bridging cable interconnecting the first and second distribution cables; first N sources of television signals coupled to the first head end for distribution to a first group of television subscribers over the first distribution cable in a first frequency band, where N is an integer including one; second N sources of television signals coupled to the second head end for distribution to a second group of television subscribers over the second distribution cable in the first frequency band; M sources of intelligence signals capable of being received at only one of the first and second head ends, where M is an integer including one; first means disposed in the one of the first and second head ends coupled to the M sources to digitally encode the intelligence signals into a digitally coded bit stream and to couple the digitally coded bit stream to the associated one of the first and second distribution cables for transmission to the other of the first and second head ends by means of the first and second distribution cables and the bridging cable in a second frequency band less than the first frequency band; and second means disposed in the other of the first and second head ends coupled to the associated one of the first and second distribution cables to decode the digitally coded bit stream and to recover the M intelligence signals for utilization.

Another feature of the present invention is the provision, in a head end interconnection system for at least two cable television systems, each of the cable television systems including a head end and at least one television signal distribution cable connected to the head ends, of an arrangement to transmit intelligence signals that can be received at only one of the head ends to the other head ends comprising: N sources of television signals coupled to the one of the head ends for distribution to a group of television subscribers over the associated one of the distribution cables in a first frequency band, where N is an integer including one; M sources of the intelligence signals, where M is an integer including one; and a circuit disposed in the one of the head ends coupled to the M sources to digitally encode the intelligence signals into a digitally coded bit stream and to couple the digitally coded bit stream to the associated one of the distribution cables for transmission to the other of the head ends by means of both the distribution cables interconnected by a bridging cable in a second frequency band less than the first frequency band.

A further feature of the present invention is the provision, in a head end interconnection system for at least two cable television systems, each of the cable television systems including a head end and at least one television signal distribution cable connected to the head end, of an arrangement to receive at one of the head ends M intelligence signals capable of being received only at the other of the head ends, the M intelligence signals being transmitted in the form of a M channel time multiplexed ternary coded bit stream on the distribution cables in a first frequency band, where M is an integer including one, comprising: N sources of television signals coupled to the one of the head ends for distribution to a group of television subscribers over the associated one of the distribution cables in a second frequency band greater than the first frequency band; and a circuit disposed in the one of the head ends coupled to the associated one of the distribution cables to decode the ternary coded bit stream and to recover the M intelligence signals for utilization.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
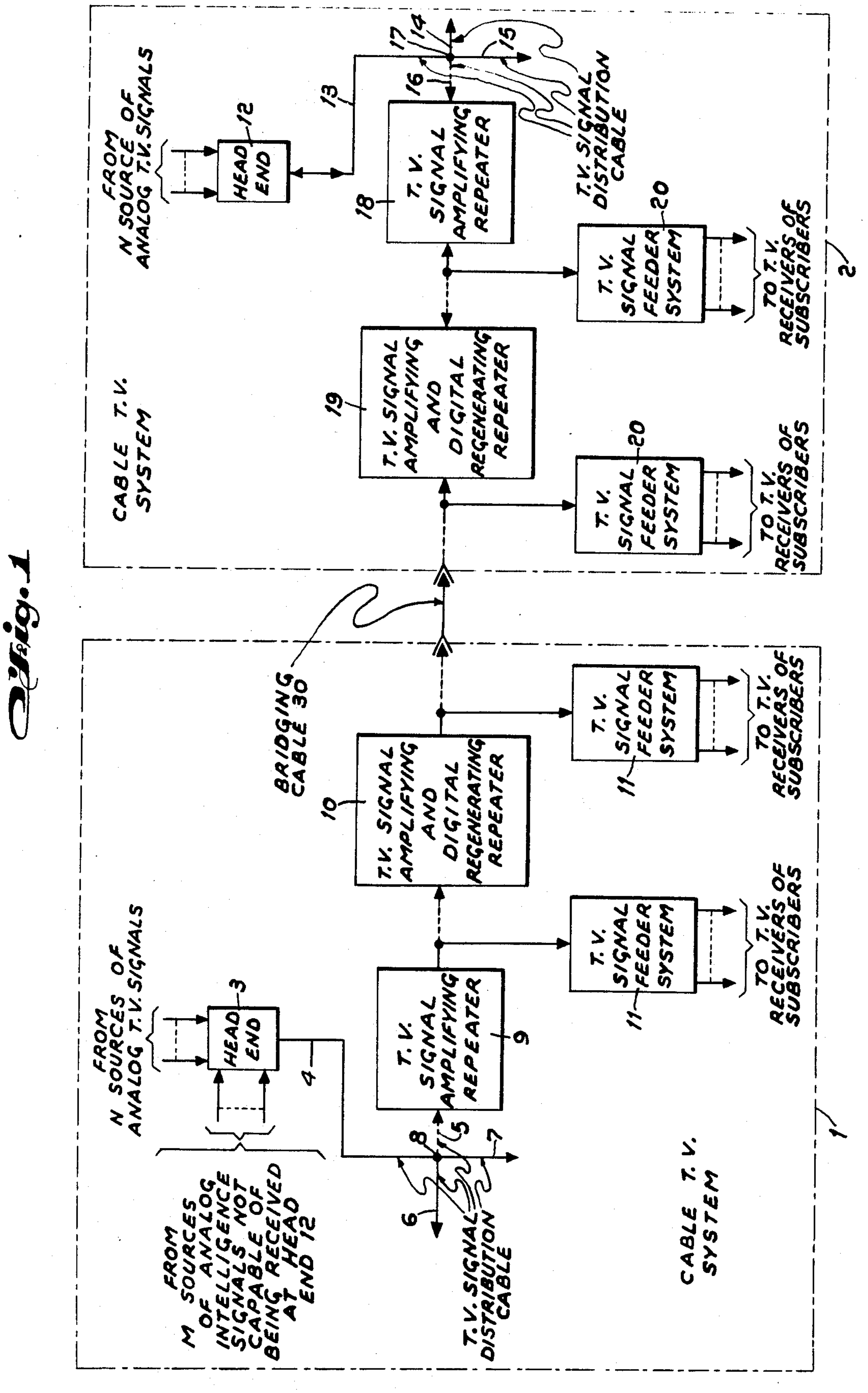
FIG. 1 is a schematic block diagram of a head end interconnection system in accordance with the principles of the present invention.

Referring to FIG. 1 there is illustrated therein two conventional cable TV systems 1 and 2. Cable TV system 1 includes a head end 3 coupled to N sources of analog TV signals which are processed in a known manner in head end 3 for distribution on TV signal distribution cables 4, 5, 6 and 7, where N is an integer including one. The branching point 8 for distribution cables 4, 5, 6 and 7 may include a splitting amplifier. Distribution cable 5 extends to a point adjacent cable system 2 and includes therein a plurality of TV signal amplifying repeaters 9 and a plurality of TV signal amplifying and regenerating repeaters 10. Repeaters 10 incorporate therein, in accordance with the principles of the present invention, digital regenerating equipment. TV signal feeder systems 11 are coupled to appropriate points along cable 5 to feed the analog TV signals to the TV receivers of TV subscribers.

System 2 includes head end 12 which is also coupled to N sources of analog TV signals which are processed therein for distribution on distribution cables 13, 14, 15 and 16. The junction point 17 between distribution cables 13, 14, 15 and 16 may include a splitting amplifier. Distribution cable 16 which extends to a point adjacent distribution cable 5 of system 1 includes therein a plurality of TV signal repeaters 18 and a plurality of TV signal amplifying and digital regenerating repeaters 19 including therein digital regenerating equipment in accordance with the principles of the present invention. A plurality of TV signal feeder systems 20 are coupled to appropriate points along cable 16 to feed the analog TV signals from the N sources to TV receivers of TV subscribers.

Distribution cables 6 and 7 may be of the type described herein with respect to cable 5 which is employed to provide an interconnection system between head end 3 of system 1 and the head end of other cable TV system, or cables 6 and 7 may be employed for only TV signal distribution to feeder systems like systems 11.

As mentioned hereinabove with respect to distribution cables 6 and 7 distribution cables 14 and 15 may include repeaters 18 and 19 to supply to head ends of other cable TV system those signals from head end 3 of system 1 that are not available at these other head ends.

In accordance with the principles of the present invention, M sources of analog intelligence signals, which are not capable of being received at head end 12, are capable of being received at head end 3, where M is an integer including one. In the description of this invention that follows it will be assumed for the purpose of illustration that M is equal to four and that the analog intelligence signals are analog TV signals. The reason that these signals of the M sources are not available at head end 12 may be for a number of reasons including the unavailability of these TV signals for off the air pickup, such as signals obtained from a telephone company's microwave system which is adjacent cable system 1 but not adjacent cable system 2 and/or due to the fact that the TV signals are blocked by the geographical terrain.

Figure 2:
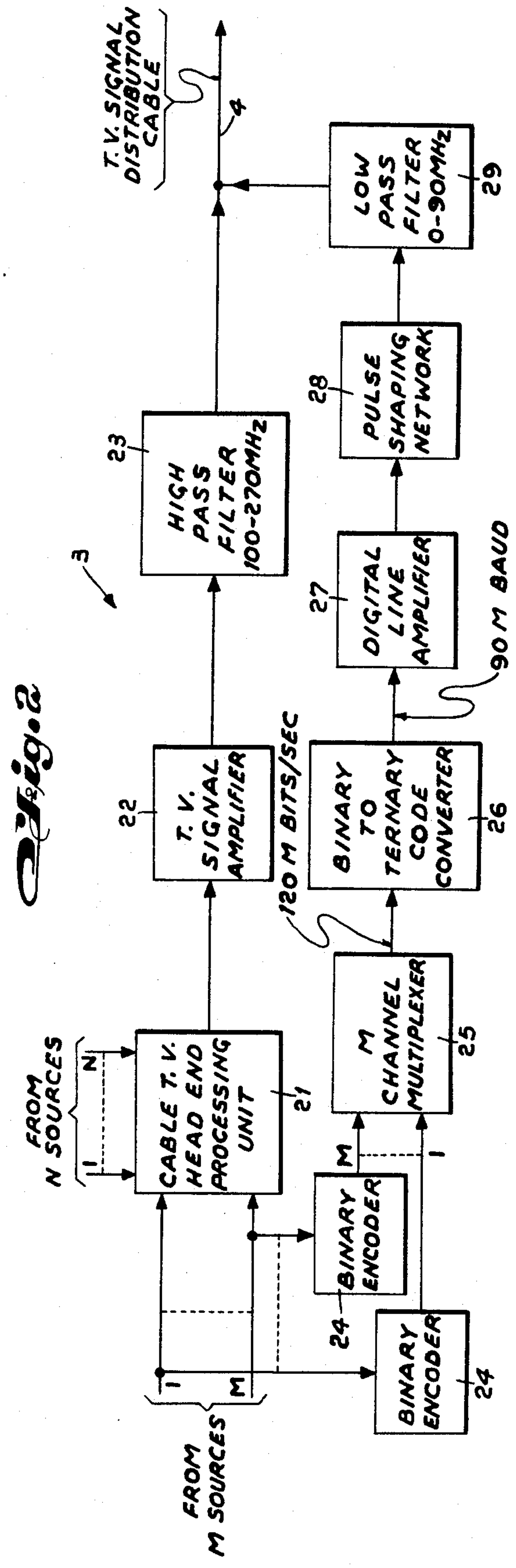
FIG. 2 is a schematic block diagram of head end 3 of FIG. 1.

The conventional head end 3 is modified as illustrated in FIG. 2 to provide the interconnection system between head end 3 and head end 12 in accordance with the principles of the present invention. Head end 3 normally includes a known cable TV head end processing unit 21 which is capable of processing the analog TV signals from the N sources and also the analog TV signals from the M sources for distribution to the subscribers of this cable TV system 1. The output signal of processing unit 21 is coupled to a TV signal amplifier 22, such as a VHF (very high frequency) amplifier and then to a high pass filter 23 having, for instance, a passband of 100–270 MHz (megahertz). The output signal of filter 23 is coupled to distribution cable 4 for coupling to distribution cable 5 through junction point 8.

In accordance with the principles of the present invention head end 3 of FIG. 2 is modified by incorporating therein binary encoders 24 equal in number to M with each of encoders 24 being coupled to a different one of the M sources. Encoders 24 are each digital TV encoders and may, for instance, be DITEC-1 encoders of Comsat Corporation. Each of the encoders 24 converts a color TV signal into a 29.6 MB/s (megabit per second) binary bit stream at the point before parity is added. Each of the encoders 24 may, for instance, produce a group of four binary bits representing amplitude of each sample of the analog TV signal. The outputs of encoders 24 (four in number in the example employed herein) are then fed to the inputs of M channel digital multiplexer 25 which produces a 120 MB/s composite or time division multiplexed binary encoded bit stream.

To reduce the line rate transmitted, the bit stream at the output of multiplexer 25 is fed to a binary to ternary code converter 26 whose output is a 90 M baud (megabaud) ternary signal. Converter 26 may, for instance, be a four bit binary to three bit binary ternary code converter. The ternary signal at the output of converter 26 is then amplified in digital line amplifier 27 and then shaped in pulse shaping network 28 to further reduce signal content above 90 MHz. The output signal of network 25 is coupled to a low pass filter 29 having a passband, for instance, of 0–90 MHz. The output signal of filter 29 is then applied to distribution cable 4.

Therefore, at the input to distribution cable 4 there is provided in accordance with frequency division multiplex techniques a digitally encoded bit stream in a first frequency band as defined by filter 29 and analog TV signals in a second frequency band as defined by filter 23.

The frequency division multiplexed signals are then propagated along distribution cable 5 through repeater 9 and 10 to be discussed hereinbelow. Distribution cable 5 is coupled to a bridging cable 30 that interconnects distribution cable 5 of system 1 with distribution cable 16 of system 2.

The digitally encoded bit stream on bridging cable 30 is applied to distribution cable 16 and flows in a direction opposite to that of the analog TV signals distributed by head end 12. These digital signals together with the analog TV signals from end 3 are propagated through repeaters 19 and 18 and, hence, to head end 12.

Figure 3:
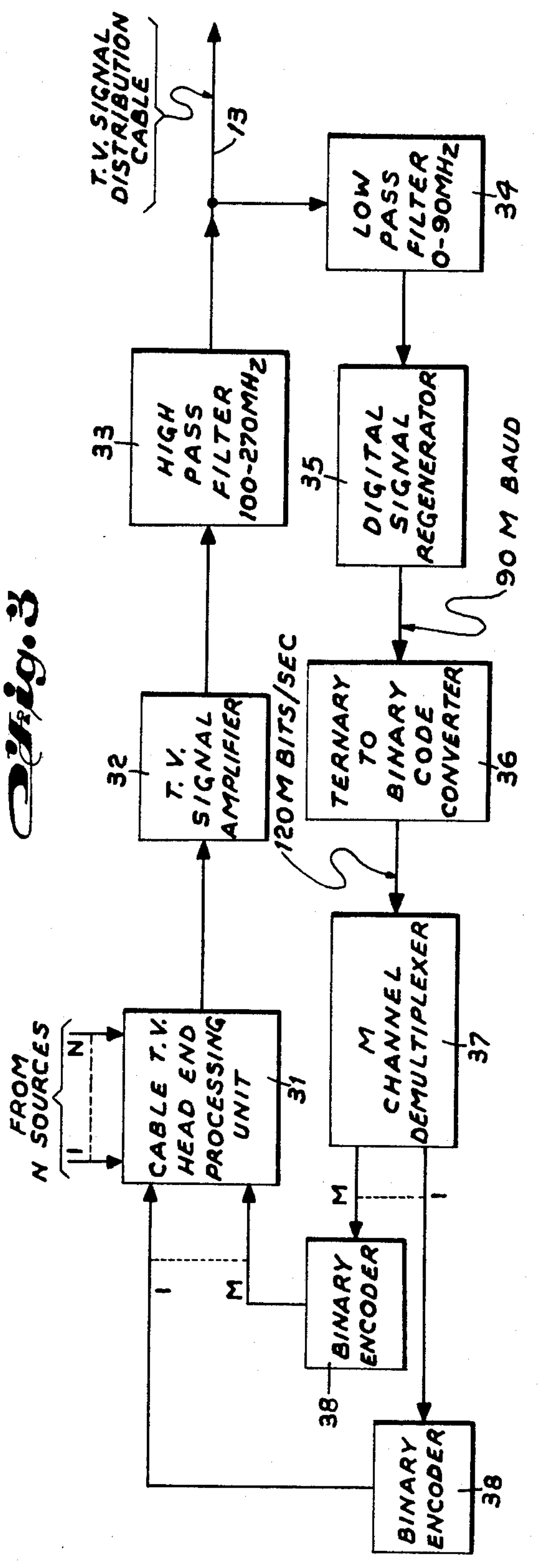
FIG. 3 is a schematic block diagram of head end 12 of FIG. 1.

Head end 12 includes therein, as illustrated in FIG. 3, a known cable TV head end processing unit 31 which processes the analog TV signals for application to TV signal distribution cable 13 and, hence, to distribution cables 14, 15 and 16 to distribute the analog TV signals to the TV receivers of the various TV subscribers of system 2. The output signal of processing unit 31 is applied to a TV signal amplifier 32 which is substantially identical to amplifier 22 of FIG. 2. The output signal of amplifier 32 is then coupled to high pass filter 33 having a passband of 100–270 HHz. Thus, the output signal of filter 33 is propagated along distribution cable 13 in an upper frequency band. In accordance with the principles of the present invention the digitally encoded bit stream received from system 1 which occupies a lower frequency band than that of the TV signals being distributed to subscribers is applied to low pass filter 34 having a passband of 0–90 MHz. The output signal of filter 34 is coupled to a digital signal regenerator 35 wherein the bit stream is amplified and equalized as well as being regenerated into a clear 90 M baud signal. This latter signal is the input to ternary to binary code converter 36 which restore the ternary digital signal to a 120 MB/s binary bit stream. According to the example employed herein three ternary bits were derived from four binary bits. Therefore, to obtain the same quality TV signal converter 36 is a three ternary bit to four binary bit code converter. The M channel demultiplexer 37 coupled to the output of converter 36 separates out the original M binary TV signals at a 29.6 MB/s rate. Each of the binary TV signals at the output of demultiplexer 37 are applied to a different one of M binary decoders 38 each of which, for instance, may be a DITEC-1 decoder of Comsat Corporation. The output signals of decoders 38 are the reconstituted analog TV signals of the M sources coupled to head end 3. These output signals from decoders 38 are coupled to processing unit 31 for conventional TV signal of cable distribution to the TV receivers of the TV subscribers.

In cable TV system 1 the transmission of the analog TV signals for distribution to subscribers and the encoded digital data stream are in the same direction so that the filtering in the repeaters 9 and 10 of cable 5 have requirements that are based on far end crosstalk criteria. The digital to TV crosstalk is kept low also by pulse shaping network 28 (FIG. 2) and the TV to digital filtering requirement is not excessive since the digital signal will have an acceptably low error rate with a 15 db (decibel) signal to noise ratio.

In cable TV system 2, as mentioned hereinabove, the digital signal and the analog TV signal for distribution to subscribers travel in opposite directions and, therefore, the high and low pass filters must take into account that the two signals are in fact traveling in different directions. Thus, either a different directional filter including both the high pass and low pass filters is used with a greater stop band rejection, or an additional supplemental filter is used at the input to regenerator 35 (FIG. 3).

Both the digital and analog TV signals need amplification at predetermined points along distribution cables 5 and 16. The cable analog TV signal needs amplification every 1500 feet when 0.500 inches cable is employed while the digital signal needs amplification only every 6600 feet, or in other words every fourth distribution cable analog TV signal repeater. Thus, there would be provided every 1500 feet a repeater 9 or a repeater 18 and every 6600 feet, or in other words every fourth repeater 9 or 18, a repeater 10 or 19.

Figures 4, 5, 6, 7:
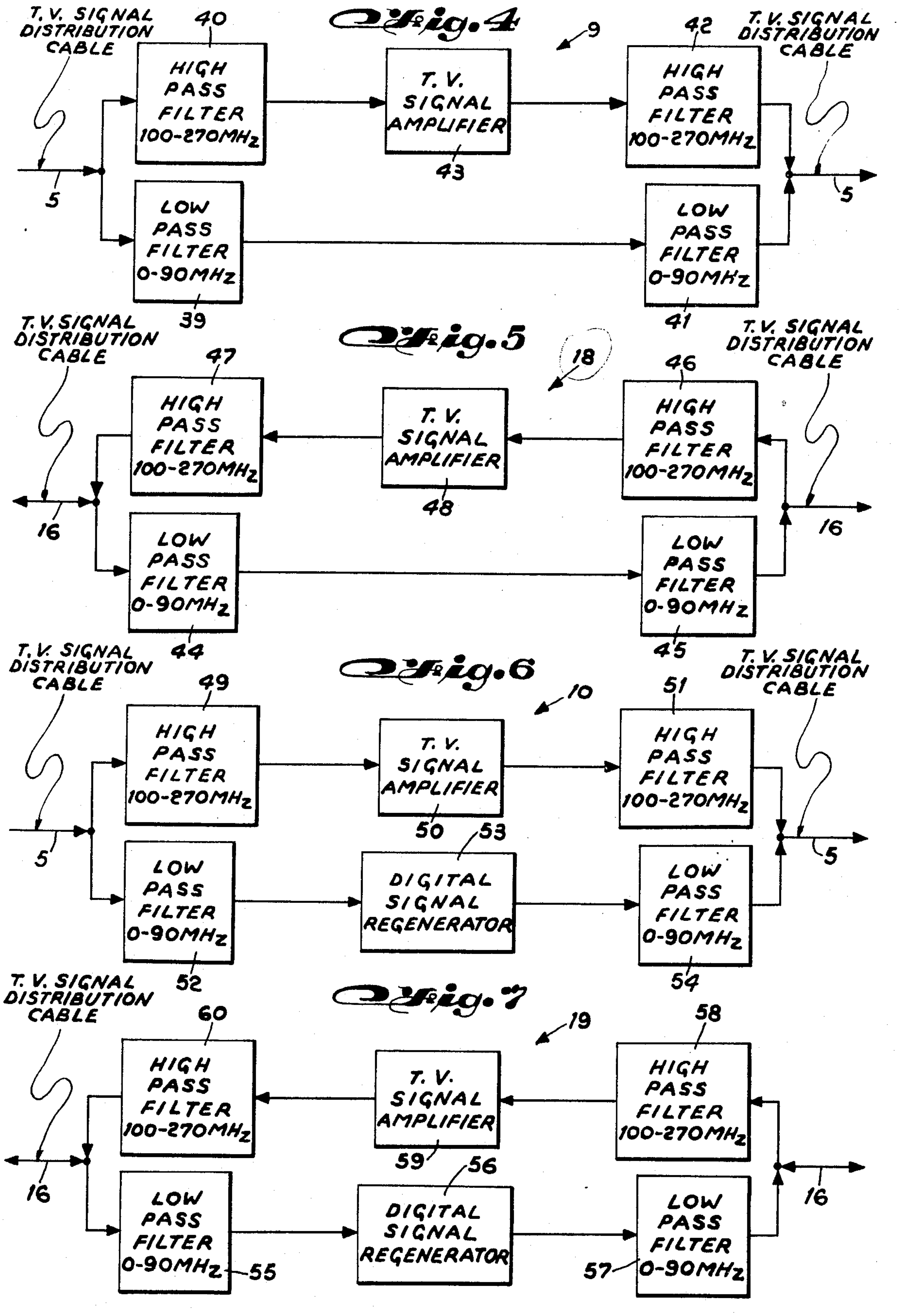
FIG. 4 is a schematic block diagram of repeaters 9 of FIG. 1.
FIG. 5 is a schematic block diagram of repeaters 18 of FIG. 1.
FIG. 6 is a schematic block diagram of repeaters 10 of FIG. 1.
FIG. 7 is a schematic block diagram of repeaters 19 of FIG. 1.

Referring to FIG. 4 there is illustrated therein one embodiment of repeaters 9 which includes an input low pass filter 39 having a passing point of 0–90 MHz for the digital bit stream and an input high pass filter 40 having a passband of 100–270 MHz for the analog TV signals being distributed. In addition, there will be an output low pass filter 41 having the same passband as filter 39 and an output high pass filter 42 having the same passband as filter 40. The digital bit stream is coupled direction between the output of filter 39 and the input of filter 41 since there is no need for amplification or regeneration of the digital stream. However, the output signal of filter 40 is coupled to the input of a TV signal amplifier 43 for amplification of the analog TV signal being distributed. The output signal of amplifier 43 is then coupled to the input of filter 42.

FIG. 5 illustrates one embodiment of repeaters 18 which includes an input low pass filter 44 having a passband of 0–90 MHz and an output low pass filter 45 having the same passband. In addition, due to the fact that the digital stream does not need regeneration or amplification the output of filter 44 is coupled to the input of filter 45. For the analog TV signal being distributed there is provided in repeaters 18 an input high pass filter 46 having a passband of 100–270 MHz and an output high pass filter 47 having the same passband. Intermediate filters 46 and 47 there is provided a TV signal amplifier 48 to provide the desired amplification of the analog TV signal being distributed.

FIG. 6 illustrates one embodiment of repeaters 10 which includes input high pass filter 49 having a passband of 100–270 MHz whose output is coupled to a TV signal amplifier 50 for amplification of the analog TV signal being distributed. The output of amplifier 50 is coupled to an output high pass filter 51 having the same passband as filter 49. In addition, repeaters 10 include an input low pass filter 52 having a passband of 0–90 MHz whose output is coupled to a digital signal regenerator 53 to regenerate and amplify the digital bit stream. The output of regenerator 53 is coupled to the output low pass filter 54 having a passband equal to the passband of filter 52.

Referring to FIG. 7 there is illustrated therein one embodiment of repeaters 19 which includes an input low pass filter 55 having a passband of 0–90 MHz whose output is coupled to digital signal regenerator 56 to amplify and regenerate the digital bit stream. The output of regenerator 56 is coupled to the output low pass filter 57 which has a passband equal to the passband of filter 55. In addition, repeaters 19 include an input high pass filter 58 having a passband of 100–270 MHz whose output is coupled to a TV signal amplifier 59 to amplify the analog TV signal being distributed. The output of amplifier 59 is coupled to output high pass filter 60 having a passband equal to the passband of filter 59.

The regeneration provided by regenerator 53 (FIG. 6) and regenerator 56 (FIG. 7) is an essential component that enables avoiding the buildup of distortion that occurs in the analog TV signals in amplifiers 50 and 59 of FIGS. 6 and 7, respectively. As illustrated in FIG. 6 the regenerating repeaters 10 serving cable system 1 are connected so that TV signal amplifier 50 passes the analog TV signal on the other hand in the same direction as digital regenerator 53 passes the digital signal. As illustrated in FIG. 7 regenerating repeaters 19 serving cable system 2 are connected so that the cable TV signal amplifier 59 passes the analog TV signal in a direction opposite to the passage of the digital signal through regenerator 56. The high and low pass filter arrangements of the various repeaters are analogous to those at the head ends 3 and 12 and these filters are not required facing bridging cable 30.

The preceding description of the head end interconnection system for cable TV signals in accordance with the principles of the present invention has been described, for purposes of explanation only, as only a TV system. However, the digitally encoded bit stream could be a composite telephony-TV-data bearing stream by employing appropriate sources for the M sources and by suitable multiplexing arrangements. Because the interconnection system is regenerative in nature due to repeaters 10 and repeaters 19, the interconnection system can be applied without limit to any number of head ends of any number of cable TV systems thereby achieving a wired city, or even a wired country network if so desired.

While I have described above the principles of my invention in connection with specific apparatus it is to be clearly understood that this description is made only by way of example and not as a limitation to the scope of my invention as set forth in the objects thereof and in the accompanying claims.

I claim:

1. A head end interconnection system for cable television systems comprising:

a first cable television system including
- a first head end, and
- a first television signal distribution cable coupled to said first head end;

a second cable television system including
- a second head end, and
- a second television signal distribution cable coupled to said second head end, said second distribution cable extending into the vicinity of said first distribution cable;

a bridging cable interconnecting said first and second distribution cables;

first N sources of television signals coupled to said first head end for distribution to a first group of television subscribers over said first distribution cable in a first frequency band, where N is an integer including one;

second N sources of television signals coupled to said second head end for distribution to a second group of television subscribers over said second distribution cable in said first frequency band;

M sources of intelligence signals capable of being received at only one of said first and second head ends, where M is an integer including one;

first means disposed in said one of said first and second head ends coupled to said M sources to digitally encode said intelligence signals into a digitally coded bit stream and to couple said digitally coded bit stream to the associated one of said first and second distribution cables for transmission to the other of said first and second head ends by means of said first and second distribution cables and said bridging cable in a second frequency band less than said first frequency band; and second means disposed in said other of said first and second head ends coupled to the associated one of said first and second distribution cables to decode said digitally coded bit stream and to recover said M intelligence signals for utilization.

2. An interconnection system according to claim 1, wherein said M intelligence signals received at said one of said first and second head ends are coupled to the associated one of said first and second distribution cables for distribution to the associated one of said first and second groups of television subscribers in said first frequency band, and said M intelligence signals recovered at said other of said first and second head ends are coupled to the associated one of said first and second distribution cables for distribution to the associated one of said first and second groups of television subscribers in said first frequency band.

3. An interconnection system according to claim 2, wherein said first means includes
- M binary encoders, each of said encoders being coupled to a different one of said M sources,
- an M channel multiplexer coupled to each of said encoders, and
- a binary to ternary code converter coupled to said multiplexer to provide said digitally coded bit stream for coupling to the associated one of said first and second distribution cables in said second frequency band.

4. An interconnection system according to claim 3, wherein said first means further includes
- a first amplifier coupled to said binary to ternary code converter to amplify said digitally coded bit stream,
- a pulse shaping network coupled to said first amplifier, and
- a first filter coupled between said network and the associated one of said first and second distribution cables to define said second frequency band.

5. An interconnection system according to claim 4, wherein said first filter is a low pass filter.

6. An interconnection system according to claim 4, wherein said second means includes a ternary to binary code converter coupled to the associated one of said first and second distribution cables, an M channel demultiplexer coupled to said ternary to binary code converter, and M binary decoders coupled to said demultiplexer, each of said decoders recovering a different one of said M intelligence signals.

7. An interconnection system according to claim 6, wherein said second means further includes a second filter coupled to the associated one of said first and second distribution cables to pass said digitally coded bit stream present in said second frequency band, and a digital signal regenerator coupled between said second filter and said ternary to binary code converter.

8. An interconnection system according to claim 7, wherein said second filter is a low pass filter.

9. An interconnection system according to claim 7, wherein each of said first and second head ends further includes a head end processing unit coupled to the associated one of said first and second N sources, a signal amplifier coupled to said processing unit, and a third filter coupled between said signal amplifier and the associated one of said first and second distribution cable to define said first frequency band;

said processing unit of said one of said first and second head ends being coupled to said M sources; and said processing unit of said other of said first and second head ends being coupled to said M decoders.

10. An interconnection system according to claim 9, wherein said third filter is a high pass filter.

11. An interconnection system according to claim 2, wherein said second means includes a ternary to binary code converter coupled to the associated one of said first and second distribution cables, an M channel demultiplexer coupled to said ternary to binary code converter, and M binary decoders coupled to said demultiplexer, each of said decoders recovering a different one of said M intelligence signals.

12. An interconnection system according to claim 11, wherein said second means further includes a first filter coupled to the associated one of said first and second distribution cables to pass said digitally coded bit stream present in said second frequency band, and a digital signal regenerator coupled between said first filter and said ternary to binary code converter.

13. An interconnection system according to claim 12, wherein each of said first and second head ends further includes a head end processing unit coupled to the associated one of said first and second N sources, a signal amplifier coupled to said processing unit, and a second filter coupled between said signal amplifier and the associated one of said first and second distribution cable to define said first frequency band;

said processing unit of said one of said first and second head ends being coupled to said M sources; and said processing unit of said other of said first and second head ends being coupled to said M decoders.

14. An interconnection system according to claim 2, wherein each of said first and second head ends further includes a head end processing unit coupled to the associated one of said first and second N sources, a signal amplifier coupled to said processing unit, and a filter coupled between said signal amplifier and the associated one of said first and second distribution cable to define said first frequency band;

said processing unit of said one of said first and second head ends being coupled to said M sources; and said processing unit of said other of said first and second head ends being coupled to said M decoders.

15. An interconnection system according to claim 2, further including a plurality of repeaters disposed at predetermined spaced points in each of said first and second distribution cables;

each of said repeaters including a first input filter to pass said first frequency band, a first output filter to pass said first frequency band, a second input filter to pass said second frequency band, a second output filter to pass said second frequency band, and an amplifier coupled between said first input filter and said first output filter to amplify those signals in said first frequency band;

selected ones of said repeaters further including a digital signal regenerator coupled between said second input filter and said second output filter to regenerate said digitally coded bit stream; and the remainder of said repeaters further including a direct connection between said second input filter and said second output filter for said digitally code bit stream.

16. An interconnection system according to claim 15, wherein said first means includes M binary encoders, each of said encoders being coupled to a different one of said M sources, an M channel multiplexer coupled to each of said encoders, and a binary to ternary code coverter coupled to said multiplexer to provide said digitally coded bit stream for coupling to the associated one of said first and second distribution cables in said second frequency band.

17. An interconnection system according to claim 16, wherein said first means further includes a first amplifier coupled to said binary to ternary code converter to amplify said digitally coded bit stream,
a pulse shaping network coupled to said first amplifier, and
a first filter coupled between said network and the associated one of said first and second distribution cables to define said second frequency band.

18. An interconnection system according to claim 17, wherein
said second means includes
a ternary to binary code converter coupled to the associated one of said first and second distribution cables,
an M channel demultiplexer coupled to said ternary to binary code converter, and
M binary decoders coupled to said demultiplexer, each of said decoders recovering a different one of said M intelligence signals.

19. An interconnection system according to claim 18, wherein
said second means further includes
a second filter coupled to the associated one of said first and second distribution cables to pass said digitally coded bit stream present in said second frequency band, and
a digital signal regenerator coupled between said second filter and said ternary to binary code converter.

20. An interconnection system according to claim 19, wherein
each of said first and second head ends further includes
a head end processing unit coupled to the associated one of said first and second N sources,
a signal amplifier coupled to said processing unit, and
a third filter coupled between said signal amplifier and the associated one of said first and second distribution cable to define said first frequency band;
said processing unit of said one of said first and second head ends being coupled to said M sources; and
said processing unit of said other of said first and second head ends being coupled to said M decoders.

21. An interconnection system according to claim 15, wherein
said second means includes
a ternary to binary code converter coupled to the associated one of said first and second distribution cables,
an M channel demultiplexer coupled to said ternary to binary code converter, and
M binary decoders coupled to said demultiplexer, each of said decoders recovering a different one of said M intelligence signals.

22. An interconnection system according to claim 21, wherein
said second means further includes
a first filter coupled to the associated one of said first and second distribution cables to pass said digitally coded bit stream present in said second frequency and, and
a digital signal regenerator coupled between said first filter and said ternary to binary code converter.

23. An interconnection system according to claim 22, wherein
each of said first and second head ends further includes
a head end processing unit coupled to the associated one of said first and second N sources,
a signal amplifier coupled to said processing unit, and
a second filter coupled between said signal amplifier and the associated one of said first and second distribution cable to define said first frequency band;
said processing unit of said one of said first and second head ends being coupled to said M sources; and
said processing unit of said other of said first and second head ends being coupled to said M decoders.

24. An interconnection system according to claim 15, wherein
each of said first and second head ends further includes
a head end processing unit coupled to the associated one of said first and second N sources,
a signal amplifier coupled to said processing unit, and
a filter coupled between said signal amplifier and the associated one of said first and second distribution cable to define said first frequency band;
said processing unit of said one of said first and second head ends being coupled to said M sources; and
said processing unit of said other of said first and second head ends being coupled to said M decoders.

25. In a head end interconnection system for at least two cable television systems, each of said cable television systems including a head end and at least one television signal distribution cable connected to said head ends, an arrangement to transmit intelligence signals that can be received at only one of said head ends to the other of said head ends comprising:
N sources of television signals coupled to said one of said head ends for distribution to a group of television subscribers over the associated one of said distribution cables in a first frequency band, where N is an integer including one;
M sources of said intelligence signals, where M is an integer including one; and
a circuit disposed in said one of said head ends coupled to said M sources to digitally encode said intelligence signals into a digitally coded bit stream and to couple said digitally coded bit stream to the associated one of said distribution cables for transmission to said other of said head ends by means of both said distribution cables interconnected by a bridging cable in a second frequency band less than said first frequency band.

26. An arrangement according to claim 25, wherein said intelligence signals of said M sources are coupled to the associated one of said distribution cables for distribution to said group of television subscribers in said first frequency band.

27. An arrangement according to claim 26, wherein said circuit includes
M binary encoders, each of said encoders being coupled to a different one of said M sources,
an M channel multiplexer coupled to each of said encoders, and a binary to ternary code converter coupled to said multiplexer to provide said digitally coded bit stream for coupling to the associated one of said distribution cables in said second frequency band.

28. An arrangement according to claim 27, wherein said circuit further includes an amplifier coupled to said code converter to amplify said digitally coded bit stream, a pulse shaping network coupled to said amplifier, and a first filter coupled between said network and the associated one of said distribution cables to define said second frequency band.

29. An arrangement according to claim 28, wherein said one of said head ends further includes a head end processing unit coupled to said N sources and said M sources, a signal amplifier coupled to said processing unit, and a second filter coupled between said signal amplifier and the associated one of said distribution cables to define said first frequency band.

30. An arrangement according to claim 29, further including a plurality of repeaters disposed at predetermined spaced points in the associated one of said distribution cables;

each of said repeaters including a first input filter to pass said first frequency band, a first output filter to pass said first frequency band, a second input filter to pass said second frequency band, a second output filter to pass said second frequency band, and an amplifier coupled between said first input filter and said first output filter to amplify those signals in said first frequency band;

selected ones of said repeaters further including a digital signal regenerator coupled between said second input filter and said second output filter to regenerate said digitally coded bit stream; and the remainder of said repeaters further including a direct connection between said second input filter and said second output filter for said digitally coded bit stream.

31. An arrangement according to claim 25, wherein said one of said head ends further includes a head end processing unit coupled to said N sources and said M sources, a signal amplifier coupled to said processing unit, and a second filter coupled between said signal amplifier and the associated one of said distribution cables to define said first frequency band.

32. An arrangement according to claim 25, further including a plurality of repeaters disposed at predetermined spaced points in the associated one of said distribution cables;

each of said repeaters including a first input filter to pass said first frequency band, a first output filter to pass said first frequency band, a second input filter to pass said second frequency band, a second output filter to pass said second frequency band, and an amplifier coupled between said first input filter and said first output filter to amplify those signals in said first frequency band;

selected ones of said repeaters further including a digital signal regenerator coupled between said second input filter and said second output filter to regenerate said digitally coded bit stream; and the remainder of said repeaters further including a direct connection between said second input filter and said second output filter for said digitally code bit stream.

33. In a head end interconnection system for at least two cable television systems, each of said cable television systems including a head end and at least one television signal distribution cable connected to said head end, an arrangement to receive at one of said head ends M intelligence signals capable of being received only at the other of said head ends, said M intelligence signals being transmitted in the form of a M channel time multiplexed ternary coded bit stream on said distribution cables in a first frequency band, where M is an integer including one, comprising:

N sources of television signals coupled to said one of said head ends for distribution to a group of television subscribers over the associated one of said distribution cables in a second frequency band greater than said first frequency band; and a circuit disposed in said one of said head ends coupled to the associated one of said distribution cables to decode said ternary coded bit stream and to recover said M intelligence signals for ultilization.

34. An arrangement according to claim 33, wherein said M intelligence signals recovered at said one of said head ends are coupled to the associated one of said distribution cables for distribution to said group of television subscribers.

35. An arrangement according to claim 34, wherein said circuit includes a ternary to binary code converter coupled to the associated one of said distribution cables, an M channel demultiplexer coupled to said code converter, and M binary decoders coupled to said demultiplexer, each of said decoders recovering a different one of said M intelligence signals.

36. An arrangement according to claim 35, wherein said circuit further includes a first filter coupled to the associated one of said distribution cables to pass ternary coded bit stream present in said first frequency band, and a digital signal regenerator coupled between said first filter and said code converter.

37. An arrangement according to claim 36, wherein said one of said head ends further includes a head end processing unit coupled to said N sources and said M sources, a signal amplifier coupled to said processing unit, and a second filter coupled between said signal amplifier and the associated one of said distribution cables to define said second frequency band.

38. An arrangement according to claim 37, further including a plurality of repeaters disposed at predetermined spaced points in the associated one of said distribution cables;

each of said repeaters including a first input filter to pass said second frequency band,
a first output filter to pass said second frequency band,
a second input filter to pass said first frequency band,
a second output filter to pass said first frequency band, and
an amplifier coupled between said first input filter and said first output filter to amplify those signals in said second frequency band;
selected ones of said repeaters further including
a digital regenerator coupled between said second input filter and said second output filter to regenerate said digitally coded bit stream; and
the remainder of said repeaters further including
a direct connection between said second input filter and said second output filter for said digitally code bit stream.

39. An arrangement according to claim 33, wherein said one of said head ends further includes
a head end processing unit coupled to said N sources and said M sources,
a signal amplifier coupled to said processing unit, and
a second filter coupled between said signal amplifier and the associated one of said distribution cables to define said second frequency band.

40. An arrangement according to claim 33, further including
a plurality of repeaters disposed at predetermined spaced points in the associated one of said distribution cables;
each of said repeaters including
a first input filter to pass said second frequency band,
a first output filter to pass said second frequency band,
a second input filter to pass said first frequency band,
a second output filter to pass said first frequency band, and
an amplifier coupled between said first input filter and said first output filter to amplify those signals in said second frequency band;
selected ones of said repeaters further including
a digital signal regenerator coupled between said second input filter and said second output filter to regenerate said digitally coded bit stream; and
the remainder of said repeaters further including
a direct connection between said second input filter and said second output filter for said digitally code bit stream.

* * * * *